United States Patent Office 3,355,478
Patented Nov. 28, 1967

3,355,478
CARBORANE-SUBSTITUTED SILICONES
Marvin M. Fein, Westfield, Joseph Green, Dover, and Eugene L. O'Brien, Rockaway, N.J., assignors to Thiokol Chemical Corporation, Bristol, Pa., a corporation of Delaware
No Drawing. Filed Sept. 30, 1964, Ser. No. 400,582
6 Claims. (Cl. 260—465)

This invention concerns the preparation of thermally stable copolymers and to a process for preparing them.

This is a continuation-in-part of application Ser. No. 344,537, filed Feb. 13, 1964, now abandoned.

More particularly, this invention relates to the preparation of silicon based-carborane and silicon based-neocarborane copolymers useful as thermally stable laminating varnishes and thermally stable potting resins. These novel copolymers have an unusual combination of excellent dielectric properties, and good dimensional stability. The copolymer products of this invention are believed to have recurring units included within the structure:

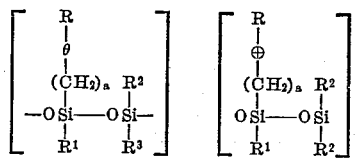

wherein $a$ is an integer including O, R, $R^1$, $R^2$ and $R^3$ which can be the same or different at any given time, are organic radicals selected from the group consisting of hydrogen, aryl, aliphatic and cycloaliphatic.

Carbonate is the trivial name used to describe all the dicarbaclovododecarboranes within the emperical formula $B_{10}C_2H_{12}$, as well as the ortho isomer. Thus the present copolymers may also be defined as consisting essentially of recurring units of the formula:

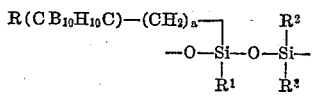

wherein R, $R^1$, $R^2$, $R^3$ and $a$ are as defined above.

The radical of the ortho isomer of dicarbaclovododecaborane throughout this application is represented by the Greek letter theta ($\theta$). The structure of this isomer is given below.

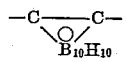

The radical of the meta isomer of dicarbaclovododecaborane throughout this application is represented by the symbol $\oplus$. The trivial name of the meta isomer of carborane is neocarborane.

Within recent years there has been an increasing need in electrical insulation application for high polymers having an unusual combination of physical and chemical properties. These properties desirably include thermal stability above 200° C., low water absorption, dimensional stability and a high dielectric constant. Materials possessing all of these properties are especially valuable for two applications, electrical potting resins and laminates for manufacturing electrical circuit boards. Epoxy resins while possessing all of the required virtues to some extent have not been entirely satisfactory insofar as thermal stability, and dielectric properties are concerned. Thus, there is a need for electrical potting compositions and for laminating varnishes having the aforementioned characteristics of chemical inertness, low water absorption, dimensional stability coupled with superior dielectric properties and thermal stability. Resins such as these would be especially desirable for high temperature applications. Unfortunately, heretofore such materials were not commonly available.

Thus, it is an object of this invention among others to prepare a novel class of thermally and dimensionally stable copolymers.

It is an additional object of this invention to prepare heretofore unknown copolymers having exceptionally high dielectric constants.

It is another object of this invention to utilize the above novel polymers for electrical potting resins and as varnishes for laminating applications.

Yet a further object of this invention is to prepare additives and components for epoxy and various other resins.

Further objects will suggest themselves to those skilled in the art after a further perusal of this patent application.

The above objects among others are achieved by the preparation of a novel group of silicon based-carborane and silicon based-neocarborane copolymers of this invention.

In practice the novel copolymers of this invention are prepared by contacting a silane-carborane reactant selected from the group consisting of:

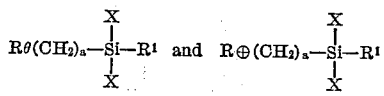

wherein $a$ is an integer including O, R and $R^1$ are organic radicals selected from the group consisting of hydrogen, aryl, aliphatic, and cycloaliphatic; $\theta$ is the carborane radical and $\oplus$ is the neocarborane radical, with a tetrasubstituted silane reactant of the formula:

wherein X is selected from the group consisting of alkoxy and halogen and $R^2$ and $R^3$ which can be the same or different are organic radicals selected from the group consisting of aliphatic, aryl, and cycloaliphatic in the presence of water until copolymer product having the structure described previously is formed, and isolating the product contained therein.

The copolymer products of this invention are produced under a wide range of reaction conditions. For example, the reaction can be run in aqueous media using water as a reactant, or the reaction can be run in an anhydrous environment. In the latter case the reaction is ordinarily conducted in inert solvent in the presence of a catalytic quantity of a Lewis acid catalyst to promote the elimination of the alkyl halide by-product. When inert solvents are used in the reaction they can be aromatic, aliphatic, cycloaliphatic or a mixture of one or more of these. Satisfactory inert solvents include benzene, toluene, xylene, hexane, heptane, diethyl ether, cyclohexane, etc. The preferred Lewis acid is anhydrous $FeCl_3$ but other anhydrous Lewis acids such as $AlBr_3$, $AlCl_3$, $BCl_3BF_3$ and the like can be used. A catalytic quantity as used throughout this application refers to the minimal amount of catalyst which will promote the desired reaction. This quantity varies from reaction to reaction but ordinarily the amount of catalyst used will exceed 0.05% by weight of the total reactants employed.

The preparative reaction depending upon reactants and reaction media used can be run at temperatures ranging between about 0° C. and about 250° C. at substantially atmospheric pressure. Higher and lower temperatures and pressures can be used with little apparent advantage. However, the processes are more commonly run at temperatures between about 40° C. and 160° C., since this temperature range not only promotes the smooth production of polymer but in those reactions where inert solvent media is employed, this temperature range includes the refluxing range of the commonly employed aromatic solvents.

The reaction time is a variable dependent upon several experimental factors including the reactants used, the molecular weight products desired and the reaction temperature employed. Generally longer reaction times produce higher molecular weight products while shorter times produce lower molecular weight products. Usually the reaction is complete between 12–200 hours with 24–100 hours being more typical.

The ratio of the reactants can be varied above and below stoichiometry as an additional means of controlling the molecular weight of the products. In most instances the ratio of the reactants required by stoichiometry can be exceeded or reduced up to 50% without adversely effecting operability.

The polymeric products of this invention are advantageous insofar as thermal stability, dielectric characteristics and the like are concerned. However, as any large group, some members of the group are preferred to the group as a whole for a variety of reasons. In this invention the preferred polymeric products are the carborane polymers having recurring units, included within the formula:

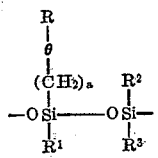

wherein R, R¹, R² and R³ are selected from the group consisting of hydrogen and lower alkyl radicals having from 1–4 carbon atoms, and where $a$ is an integer ranging from 2 up to and including 4.

The above described carborane products are the preferred embodiments because of the relative ease of preparation of the reactants and that they are obtained in good yields using the inventive process. For example, the carboranes are generally preferred to the comparable neocarborane products in that the neocarborane reactants must be made from carborane or one of its derivatives. This makes the neocarboranes more costly and tedious to prepare. Similarly, compared to the group of carborane polymers having alkylene groups containing more than 2–4 carbon atoms separating the silicon atom and carborane radical, yields are somewhat better and the precursors are more readily prepared. As indicated earlier, the products having less than 2 methylene groups cannot be prepared by the inventive process and must be prepared indirectly.

The silane-carborane reactants of this invention are prepared by several different reactions. In the preferred practice the products with alkylene groups having from 2–6 carbon atoms are prepared by the reaction of a silane hydride reactant with a alkenyl carborane (or alkenyl neocarborane) reactant in the presence of a noble metal catalyst preferably below about 50° C.

The preferred reaction processes for preparing the silane-carborane or silane-neocarborane reactants where 2–6 methylene groups separate the carborane (or neocarborane) radical and the double bond are shown below:

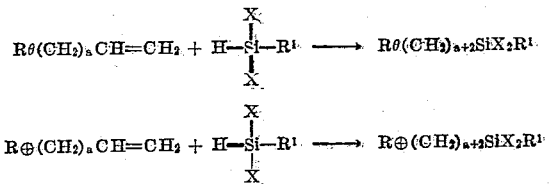

wherein $a$ is an integer including 0, X is selected from the group consisting of halogen and alkoxy and R and R¹ which can be the same or different are selected from the group consisting of hydrogen, aliphatic, cycloaliphatic and aryl radicals, $\theta$ is the symbol for the ortho carborane radical and $\oplus$ is the isomeric (meta) neocarborane radical.

The above reactions are conveniently conducted without solvents at temperatures ranging from 20 to 200° C. preferably at temperatures ranging from 30 to 65° C. in the presence of a noble metal catalyst until substantial quantities of the product are formed.

The solution containing either the silane-carborane or silane-neocarborane reactant product is separated from the insoluble materials in the reaction mixture using filtration, centrifugation or any other convenient means of separating liquids and solids. The filtrate is collected and fractionally distilled under a high vacuum to yield the purified product as a high boiling, thermally stable material. While solvents are not required, the reaction can be conduced in the presence of inert solvents if desired. Typical solvents include the alkanes, aromatics and the like. The order of adding the reactants is not important to the success of the reaction. Similarly, the ratios of the two reactants are not critical to the reaction as long as approximately stoichiometric ratios are maintained. However, the reaction can be successfully run when as much as 25% excess of either reactant over the stoichiometric amount is present.

The noble metal catalyst required for maximum yields of the silane-carborane reactants are the noble metals or sources of the noble metals used with or without inert supporting materials or matrices. Satisfactory noble metals include osmium, iridium, platinum, palladium, rhodium, ruthenium among others. Platinum or palladium supported on charcoal and the like are the favored catalysts when the free noble metals are utilized, because of lower cost, commercial availability and the good yields that are obtained.

A preferred source of the noble metals are the halonoble metal "acids" such as chloroplatinic acid. When these catalysts are used, no inert support is required since the reagents are liquid in form and can be readily dispersed into the reaction mixture.

As indicated above, the above method cannot be used to prepare the carborane or neocarborane derivatives wherein there is no alkylene group or where the alkylene group has only one carbon atom. To prepare these compounds as well as the other compounds of this invention, a less preferred process can be utilized. This process involves the formation of a Grignard reagent through the reaction of magnesium shavings in ether with a haloalkyl-carborane. The carborane-Grignard is then reacted in excess ether with a trihaloalkyl silane or preferably a trialkoxyalkyl silane followed by distillation to the desired 1-tetra- (substituted silylalkyl) carborane.

For example, the 1-(4-methyldiethoxysilylmethyl) carborane product H$\theta$CH$_2$Si(OC$_2$H$_5$)$_2$CH$_3$ can be prepared by the above process by reacting 15 parts by weight of the Grignard of bromomethyl carborane (BrCH$_2\theta$H) with a stoichiometric excess of diethoxymethyl silane at ether reflux temperature and distilling off the desired product. A product not having any CH$_2$ groups such as

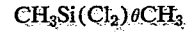

can be prepared among other ways by reacting ethyl Grignard (C$_2$H$_5$MgBr) with CH$_3\theta$H, to form CH$_3\theta$MgBr, then reacting the carborane Grignard with the silane, CH$_3$Si(Cl$_2$)H to form the silane-carborane product. Purification and isolation procedures are identical. The corresponding neocarborane (H$\oplus$CH$_2$Si(OC$_2$H$_5$)$_2$CH$_3$) can be prepared by the comparable reactions. The other 1-(4-alkyldialkoxysilylalkyl) carborane (or neocarborane) with higher alkylene groups can be prepared by this method but yields are relatively poor.

The tetrasubstituted silane reactants such as the dialkyl-dialkoxysilanes, the dialkyldihalosilanes and the dialkyl-haloalkoxysilanes are commercially available products.

Analogous preparations of the reactants are disclosed in the patent and technical literature including chemical abstracts.

The detailed workings of the invention may be gleaned by the following embodiments which are set forth below.

One aspect of the inventive concept is to react a silane-carborane of the formula: $H\theta(CH_2)_aSiX_2R^1$, where $a$, $X$ and $R^1$ have the meaning previously ascribed to them, with a di-loweralkyldialkoxysilane in the presence of water at temperatures between 0° C. and 200° C. until analysis and the increased viscosity indicate the desired polymer has been formed. The product is then isolated by stripping off the excess water.

An illustrative embodiment of this reaction is the preparation of the following carborane copolymer:

A mixture of 35.4 parts by weight of

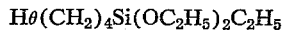

$$H\theta(CH_2)_4Si(OC_2H_5)_2C_2H_5$$

and 14.8 parts by weight of dimethyldiethoxysilane are slowly heated with water to about 100° C. for about 24 hours. The reaction is conducted in a vessel fitted with a means for stirring, heating, distillation and cooling. The temperature of the stirred reaction mixture is slowly raised to 150° C. and is maintained at about this temperature for 24 hours. At the end of this time the heating is halted and the reaction product is isolated. The product is a transparent clear resin having a softening point about 50° C. The product is stable after extended heating to 200° C.

A further embodiment of the above preferred reaction is demonstrated by the preparation below:

A mixture of 3.6 parts by weight of $$H\theta(CH_2)_6Si(OCH_3)_2\text{—n—}C_3H_7$$

and 2.6 parts by weight of dipropyldibutoxysilane are heated with water, slowly bringing the temperature to about 160° C. and maintaining the heating for approximately 36 hours. At the end of this time the product is isolated as a transparent clear resin having a softening point about 80° C. The polymer is stable above 200° C. upon extended heating.

Yet another preferred embodiment of the reaction described above is the copolymer prepared by heating a reaction mixture of $H\theta(CH_2)_4Si(OCH_5)_2CH_3$ reactant (34 parts by weight), dimethyldiethoxysilane (2.9 parts by weight), with water for 18 hours at about 100° C. At the end of this time the heating is stopped and the product is isolated as a clear resin having a softening point about 60° C. which is stable up to 400° C.

A further embodiment is the copolymer prepared by heating 38 parts by weight of

$$H\theta(CH_2)_4Si(OC_2H_5)_2\text{—n—}C_4H_9$$

15 parts by weight of dimethyldiethoxysilane with excess of water for 8 hours at 80–90° C. The polymerized product obtained is a clear resin having good thermal stability.

A modification of the preferred inventive polymerization reaction is to react a silane-carborane reactant of the formula: $H\theta(CH_2)_aSi(alkoxy)_2R^1$, where $a$ and $R^1$ have the meaning previously ascribed to them with a di-loweralkyldihalosilane and water at the elevated temperatures described earlier and isolating the copolymer product produced.

An illustrative embodiment of this aspect of the reaction is the preparation of the following copolymer:

A mixture of 35.4 parts by weight of

$$H\theta(CH_2)_4Si(OC_2H_5)_2C_2H_5$$

and 12.9 parts by weight of dimethyldichlorosilane are slowly heated with water to about 100° C. for about 6 hours. The reaction is conducted in a vessel fitted with a means for stirring, heating, distillation and cooling. The temperature of the stirred reaction mixture is slowly raised to 160° C. and is maintained at about this temperature for 32 hours. At the end of this time the heating is halted and the reaction product is isolated. The resinous product is stable at elevated temperatures.

Another variation of the inventive concept is to react the silane-carborane reactants with a di-loweralkyldialkoxysilane and water at temperatures between 0° C. and 200° C. until analysis and the increased viscosity indicate the desired polymer has been formed. Again the same techniques are used as described earlier.

A mixture of 3.3 parts by weight of

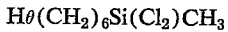

$$H\theta(CH_2)_6Si(Cl_2)CH_3$$

reactant, and 1.5 parts by weight of dimethyldiethoxysilane are heated with water in a reaction vessel fitted with a means for stirring and heating and cooling. The stirred reaction mixture is slowly heated to 180° C. and is maintained at about this temperature for 24 hours. At the end of this time the heating is halted and the reaction product is isolated. The product is a transparent clear resin having a softening point below room temperature. The product is stable after extended heating at elevated temperatures.

Another variation of the basic inventive process is the preparation of copolymers by contacting silane-carboranes having 2 halogens substituted on the silicon atom with a di-loweralkyldihalosilane and water in the manner previously described. An illustrated embodiment follows:

A mixture of 41 parts by weight of

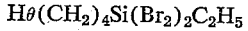

$$H\theta(CH_2)_4Si(Br_2)_2C_2H_5$$

reactant and 20 parts by weight of dipropyldiethoxysilane are slowly heated with water to about 80° C. for about 24 hours. The reaction is conducted in a vessel fitted with a means for stirring, heating, distillation and cooling. The temperature of the stirred reaction mixture is slowly raised to 150° C. while the pressure is kept at 100 mm. and is maintained at about this temperature for 24 hours. At the end of this time the heating is halted and the reaction product is isolated. The product is a transparent clear resin having a softening point at about 50° C. The product is stable upon heating to 400° C.

As indicated previously, an equally valuable aspect of the inventive process is one in which the silane-caborane or silane-neocarborane reactants are reacted in an anhydrous, inert, non-polar solvent media preferably in the presence of a catalytic amount of a Lewis acid until the copolymer is formed in substantial yield. Excess solvent is stripped off prior to isolation and the isolated polymer is dried prior to use. The main requirement for this process is that one of the reactants has two available halogen sites while the other has two available alkoxy sites. The reaction conditions for the process are substantially the same for both the anhydrous process and the process in which water is a reactant.

In one embodiment equimolar quantities of $$H\theta(CH_2)_4Si(Cl_2)C_6H_5\text{(phenyl)}$$

reactant, and dimethyldimethoxysilane are refluxed in anhydrous benzene with a catalytic quantity of anhydrous ferric chloride for a period of about 36 hours. The benzene is stripped off and the residue is washed with water and dried. A viscous liquid product having a molecular weight of above 2500 is obtained. The product is thermally stable.

A second embodiment of the above described process is to reflux equimolar quantities of

$$H\theta(CH_2)_5Si(OCH_3)_2\text{—n—}C_3H_7$$

and dimethyldichlorosilane in anhydrous benzene with catalytic quantity of ferric chloride for a period of 30 hours. The benzene is stripped off and the polymeric residue is washed with water and dried. A high molecular weight liquid polymer thermally stable above 200° C. is obtained.

Another embodiment of the above reaction run under anhydrous conditions is to reflux an equimolar reaction mixture of $CH_3Si(OC_2H_5)_2(CH_2)_2\theta H$ and di-n-butyldibromosilane, in toluene with a catalytic quantity of anhydrous ferric chloride for 60 hours. A viscous material having a molecular weight between 1700 and 3000 is obtained after stripping off the toluene. The product is stable above 200° C.

A further embodiment of the reaction run in anhydrous media, equimolar quantities of

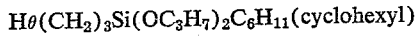
$H\theta(CH_2)_3Si(OC_3H_7)_2C_6H_{11}$ (cyclohexyl)

and dimethyldichlorosilane are refluxed in anhydrous benzene and a catalytic quantity of anhydrous ferric chloride for a period of about 36 hours. The benzene is stripped off and the residue is washed with water and dried. A viscous liquid product having a molecular weight of above 2500 is obtained. The product is thermally stable above 200° C.

Additional copolymers of this invention can be prepared by heating the following reactants in equimolar quantities at temperatures ranging between 150–200° C. in the presence of inert solvent for 36–48 hours:

$H\theta(CH_2)_6Si(OCH_3)_2$—n—$C_3H_7$ and dipropyldichlorosilane,
$H\theta(CH_2)_4Si(OC_2H_5)_2CH_3$ and dimethyldibromosilane,
$H\theta(CH_2)_4Si(Cl_2)CH_3$ and dimethyldiethoxysilane,
$H\theta(CH_2)_4Si(Cl_2)CH_3$ and dipropyldibutoxysilane,
$H\theta(CH_2)_4Si(Cl_2)C_6H_{13}$ and dimethyldiethoxysilane,
$H\theta(CH_2)_4Si(OC_3H_7)_2$ cyclohexyl and dimethyldiethoxysilane,
$H\theta(CH_2)_6Si(OC_2H_5)_2$—p—chlorophenyl and dimethyldiethoxysilane and the like.

The preceding embodiments have all dealt with copolymers prepared by reacting silane-carboranes of the formula: $RSiX_2(CH_2)_a\theta H$ with silanes of the formula: $R^2R^3SiX_2$. A homologous and higher molecular series of polymers results when the same silane reactant is contacted with a carborane reactant in which the hydrogen terminating the carborane group is replaced with a radical selected from the group consisting of aliphatic, aryl and cycloaliphatic, i.e. $RSiX_2(CH_2)_a\theta R^1$, wherein R, $R^1$ and X have the meanings previously given to them. These embodiments follow:

A mixture of 50 parts by weight of

$CH_3SiCl_2(CH_2)_4\theta C_2H_5$ reactant and 20 parts by weight of dimethyldichlorosilane are slowly heated with water to about 80° C. for about 24 hours. The reaction is conducted in a vessel fitted with a means for stirring, heating, distillation and cooling. The temperature of the stirred reaction mixture is slowly raised to 150° C. while the pressure is kept at 100 mm. and is maintained at about this temperature for 24 hours. At the end of this time the heating is halted and the reaction product is isolated. The resin product has a high softening point and is stable above 200° C., even upon prolonged heating.

In another embodiment equimolar quantities of

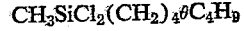
$CH_3SiCl_2(CH_2)_4\theta C_4H_9$ reactant, and dipropyldiethoxysilane are refluxed in anhydrous benzene with a catalytic quantity of anhydrous ferric chloride for a period of about 36 hours. The benzene is stripped off and the residue is washed with water and dried. A viscous liquid product having a molecular weight of above 1000 is obtained. The product is thermally stable above 200° C.

A second embodiment of the above described process is to reflux equimolar quantities of

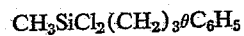
$CH_3SiCl_2(CH_2)_3\theta C_6H_5$ and dimethyldiethoxysilane in anhydrous benzene and a catalytic quantity of ferric chloride for a period of 30 hours. The benzene is stripped off under vacuum and the polymeric residue washed with water and dried.

As indicated by the previous discussion, a related series of embodiments is the preparation of the corresponding silane-neocarborane copolymers.

One aspect of the inventive concept is to react a neocarborane of the formula $H\oplus(CH_2)_a(OX)_2R$, R and X having their previous meanings with a di-loweralkyldialkoxysilane and water at temperatures between 0° C. and 200° C. until analysis and the increased viscosity indicate the desired polymer has been formed and stripping off the excess water by raising the reaction temperature above 100° C. and maintaining vacuum.

An illustrative embodiment of this reaction is the preparation of the following silane-neocarborane copolymer:

A mixture of 35.4 parts by weight of

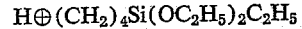
$H\oplus(CH_2)_4Si(OC_2H_5)_2C_2H_5$ and 14.8 parts by weight of dimethyldiethoxysilane are slowly heated with water to about 100° C. for about 24 hours. The reaction is conducted in a vessel fitted with a means for stirring, heating, distillation and cooling. The temperature of the stirred reaction mixture is slowly raised to 150° C. and is maintained at about this temperature for 24 hours. At the end of this time the heating is halted and the reaction product is isolated. The resin product has a softening point above 40° C. The product is stable after extended heating above 200° C.

A further embodiment of the preparation is:

A mixture of 3.6 parts by weight of

$H\oplus(CH_2)_6Si(OCH_3)_2$—n—$C_3H_7$ and 2.6 parts by weight of dipropyldibutoxysilane are heated with water, slowly bringing the temperature to about 160° C. and maintaining the heating for approximately 36 hours. At the end of this time the product is isolated as a transparent clear resin having a softening part above 50° C. The polymer is stable above 200° C. upon extended heating.

Yet another preferred embodiment of the reaction described above is the copolymer prepared by heating a reaction mixture of the silane-neocarborane

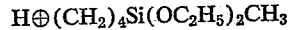
$H\oplus(CH_2)_4Si(OC_2H_5)_2CH_3$ (34 parts by weight), dimethyldiethoxysilane (2.9 parts by weight), with excess of water for 18 hours at about 100° C. At the end of this time the heating is stopped and the product is isolated as a clear resin having a softening point about 40° C. which is stable above 200° C.

A further embodiment is the silane-neocarborane copolymer prepared by heating 38 parts by weight of

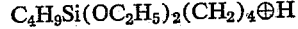
$C_4H_9Si(OC_2H_5)_2(CH_2)_4\oplus H$ 15 parts by weight of dimethyldiethoxysilane within excess of water for 8 hours at 80–90° C. The polymerized product obtained is a clear resin having a softening point above 50° C. and which is stable at temperatures above 200° C.

Another illustrative embodiment of this aspect of the reaction is the preparation of the following silane-neocarborane copolymer:

A mixture of 35.4 parts by weight of

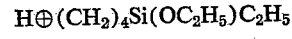
$H\oplus(CH_2)_4Si(OC_2H_5)C_2H_5$ and 12.9 parts by weight of dimethyldichlorosilane are slowly heated with water to about 100° C. for about 6 hours. The reaction is conducted in a vessel fitted with a means for stirring, heating, distillation and cooling. The temperature of the stirred reaction mixture is slowly raised to 160° C. and is maintained at about this temperature for 32 hours. At the end of this time the heating is halted and the reaction product is isolated. The product is a transparent clear resin having a softened point above 50° C. The product is stable after extended heating above 200° C.

Another variation of the inventive concept is to react a silane-neocarborane of the formula $H\oplus(CH_2)_aSi(X_2)R$, where R and X have their previous meanings, with a di-loweralkyldialkoxy silane and water at temperatures between 0° C. and 200° C. until analysis and the increased viscosity indicate the desired polymer has been formed. Again the same techniques are used as described earlier.

An illustration of this embodiment is to heat a mixture of 3.3 parts by weight of the silane-neocarborane reactant, $CH_3Si(Cl_2)(CH_2)_6\oplus H$ and 1.5 parts by weight of dimethyldichlorosilane with water in a reaction vessel fitted with a means for stirring and heating and cooling. The stirred reaction mixture is slowly heated to 180° C. and is maintained at about this temperature for 24 hours. At the end of this time the heating is halted and the reaction product is isolated. The product is a transparent clear resin having a softening point about 50° C. The product is stable after extended heating above 200° C.

Another variation of the basic inventive process is the preparation of copolymers by contacting silane-neocarboranes of the formula $H\oplus(CH_2)_aSi(X_2)R$ with di-loweralkyldihalosilanes and water in the manner previously described.

An illustrated embodiment is:

A mixture of 41 parts by weight of the silane-neocarborane reactant $C_2H_5Si(Cl_2)(C_4H_8\oplus H)$ and 20 parts by weight of dipropyldichlorosilane are slowly heated with water to about 80° C. for about 24 hours. The reaction is conducted in a vessel fitted with a means for stirring, heating, distillation and cooling. The temperature of the stirred reaction mixture is slowly raised to 150° C. while the pressure is kept at 100 mm. and is maintained at about this temperature for 24 hours. At the end of this time the heating is halted and the reaction product is isolated. The product is a transparent clear resin having a softening point about 50° C. The product is stable after extended heating above 200° C.

In another embodiment the reaction is conducted in anhydrous solvent. For instance, equimolar quantities of $C_6H_5Si(Cl_2)(CH_2)_4\oplus H$ reactant, and dimethylidethoxysilane are refluxed in an hydrous benzene with a catalyic quantity of anhydrous ferric chloride for a period of about 36 hours. The benzene is stripped off and the residue is washed with water and dried. A product having a molecular weight of above 1000 is obtained. The product is thermally stable above 200° C.

A second embodiment of the above described process is to reflux equimolar quantities of the silane-neocarborane $H\oplus(CH_2)_5Si(OCH_3)_2-n-C_3H_7$ and dimethyldichlorosilane in anhydrous benzene with a catalytic quantity of ferric chloride for a period of 30 hours. The benzene is stripped off and the polymeric residue is washed and dried. A polymer which is thermally stable to 200° C. is obtained.

Another embodiment of the above reaction run under anhydrous conditions is to reflux an equimolar reaction mixture consisting of the silane-neocarborane reactant, $H\oplus(CH_2)_2Si(OC_2H_5)_2CH_3$ and di-n-butyldichlorosilane in toluene for 60 hours. A viscous material having molecular weight between 1700 and 3000 is obtained. The product is stable up to 200° C.

A further illustration of the reaction run in anhydrous media is to reflux equimolar quantities of $$H\oplus(CH_2)_3Si(OC_3H_7)_2-C_6H_{12}$$

(cyclohexyl) and dimethyldichlorosilane in anhydrous benzene with a catalytic quantity of anhydrous ferric chloride for a period of about 36 hours. The benzene is stripped off and the residue is washed with water and dried. A viscous liquid product having a molecular weight of above 2500 is obtained. The product is thermally stable above 200° C.

Additional neocarborane-silane copolymers of this invention can be prepared by heating the following reactants in equimolar quantities in refluxing benzene for 36–48 hours:

$H\oplus(CH_2)_6Si(OCH_3)_2-n-C_3H_7$ and dipropyldichlorosilane, $H\oplus(CH_2)_4Si(OC_2H_5)_2$ and dimethyldibromosilane, $H\oplus(CH_2)_4Si(Cl_2)CH_3$ and dimethyldiethoxysilane, $H\oplus(CH_2)_4Si(Cl_2)CH_3$ and dipropyldibutoxysilane, $H\oplus(CH_2)_4Si(Cl_2)-n-C_6H_{13}$ and dimethyldiethoxysilane, $H\oplus(CH_2)_4Si(OC_3H_7)-C_6H_{12}$ (cyclohexyl) and dimethyldiethoxysilane, $H\oplus(CH_2)_6Si(OC_2H_5)-p-$chlorophenyl and dimethyldiethyldiethoxysilane and the like.

Another series of embodiments which are representative of the inventive concept is the preparation of neocarborane copolymers by the reaction of neocarboranes of the formula: $RSiX_2(CH_2)_aOR$, with silanes of the formula: $R^2R^3SiX_2$ and water, R, $R^1$, $R^2$, $R^3$ and X having the meaning previously ascribed to them. Illustrative embodiments follows:

A mixture of 41 parts by weight of

$$C_2H_5SiCl_2(CH_2)_2\oplus C_2H_5$$

and 20 parts by weight of methyldiethoxysilane are slowly heated with water to about 80° C. for about 24 hours. The reaction is conducted in a vessel fitted with a means for stirring, heating, distillation and cooling. The temperature of the stirred reaction mixture is slowly raised to 150° C. while the pressure is kept at 100 mm. and is maintained at about this temperature for 24 hours. At the end of this time the heating is halted and the reaction product is isolated. The product is a transparent clear resin stable upon prolonged heating above 200°.

In another embodiment, equimolar portions of silane-neocarborane, $C_3H_7Si(C_2H_5O)_2(CH_2)_3\oplus CH_3$ and dimethyldichlorosilane and benzene are heated together for 30 hours at 85° C. with a catalytic quantity of anhydrous ferric chloride. After the initial heating period the mixture is refluxed for 110 hours. Then the reaction is halted and the reaction product is isolated.

In another embodiment, equimolar quantities of the silane-neocarborane, $p-Cl-C_6H_5SiCl_2(CH_2)_4\oplus CH_3$ is refluxed with dimethyldiethoxysilane, in benzene with a catalytic quantity of anhydrous ferric chloride. The refluxing step is continued for about 36 hours. The benzene is stripped off and the residue is washed with water and dried. A viscous liquid product having a molecular weight of above 3000 is obtained. The product is thermally stable above 200° C.

In still another embodiment, $C_4H_9SiCl_2(CH_2)_3\oplus CH_3$ and dimethyldiethoxysilane in equimolar quantities are refluxed in anhydrous benzene with a catalytic quantity of ferric chloride for a period of 30 hours. The benzene is stripped off under vacuum and polymeric residue dried.

Another illustrative embodiment of this reaction is the preparation of the following copolymer:

A mixture of 36 parts by weight of the neocarborane, $CH_3SiCl_2(CH_2)_3\oplus CH_3$ and 16 parts by weight of dimethyldichlorosilane are slowly heated with water to about 100° C. for about 24 hours in an appropriately fitted reaction vessel. The temperature of the stirred reaction mixture is slowly raised to 150° C. and is maintained at about this temperature for 30 hours. At the end of this time the heating is halted and the reaction product is isolated. The product is a resin which is stable above 200° C. and which has a high softening point.

A further embodiment is demonstrated by the preparation below:

A mixture of 6 parts by weight of the neocarborane, $CH_3SiCl_2(CH_2)_4\oplus CH_3$ and 35 parts by weight of dipropyldichlorosilane are heated with water, slowly bringing the temperature to about 160° C. and maintaining the heating for approximately 36 hours. At the end of this time the product is isolated as a transparent clear resin having a softening point above 50° C. The polymer is stable up to 200° C. upon extended heating.

Yet another embodiment of the reaction described above is the copolymer prepared by heating a reaction mixture of $CH_3Si(OC_2H_5)_2(CH_2)_4 \oplus H$ reactant (30 parts by weight), dimethyldiethoxysilane (4.0 parts by weight), with excess of water for 18 hours at about 100° C. At the end of this time the heating is stopped and a resin product having a softening point about 40° C. which is stable up to 200° C.

A further embodiment is the copolymer prepared by heating 38 parts by weight of $$C_4H_9Si(OC_2H_5)_2(CH_2)_4 \oplus C_4H_9$$

and 15 parts weight of dimethyldiethoxysilane in water. The temperature is slowly raised from about 75° C. to 160° C. at which point the reaction is allowed to continue for about 36 hours. At the end of this time the product is isolated as a resin having thermal stability above 200° C.

The following examples describe the inventive copolymer preparations in more detail.

*Example 1.—Preparation of a copolymer of 1-(methyldiethoxysilyl-4-butyl)-carborane and dimethyldiethoxysilane*

A. PREPARATION OF 1-(METHYLDIETHOXYSILYL-4-BUTYL)CARBORANE INTERMEDIATE

A 50 parts by weight portion of 1-(3-butenyl) carborane and 100 parts by weight of methyldiethoxysilane is refluxed 60 hours with 0.5 part by weight of 2.5% platinum on charcoal catalyst contained in an appropriate reaction vessel. At the end of this time the reaction mixture is filtered and the filtrate is concentrated at 100° C. and 5 mm. Hg. The concentrated filtrate is refluxed for an additional 12 hours with 50 parts by weight of fresh methyldiethoxysilane and 0.5 part by weight of 5% platinum on charcoal. A total of 41.3 parts by weight of intermediate is obtained after filtering. The intermediate boiled at 180° C./0.5 mm. of mercury. Infrared and elemental analysis agreed with the expected ones for

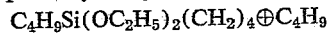
$$CH_3Si(OC_2H_5)_2(C_4H_8 \theta H)$$

B. PREPARATION OF COPOLYMER PRODUCT

A mixture of 50 parts by weight of the above monomer 4.4 parts by weight of dimethyldiethoxysilane are heated with water in a reaction vessel fitted with a means for stirring and heating and cooling. The stirred reaction mixture is slowly heated to 150° C. and is maintained at about this temperature for 24 hours. At the end of this time the heating is halted and the reaction product is isolated. The product is a transparent clear resin having a softening point at about 60° C. The product is stable after extended heating to 400° C. Infrared analysis established that the polymer had the desired structure.

*Example 2.—Preparation of another copolymer of 1-(methyldiethoxysilyl-4-butyl)-carborane and dimethyldiethoxysilane*

Equimolar quantities of the aforesaid carboranyl monomers (prepared as described in Example 1A) and dimethyldiethoxysilane are heated with water at 80°–90° C. for 8 hours. The temperature is then raised to 120° C. and heating is continued for an additional 160 hours. The product is a viscous liquid at room temperature and has a molecular weight of about 1700 and a thermal stability of up to 400° C.

This example is illustrative of the fact that the nature of the polymer obtained is not only dependent upon the reactants, but their relative proportions and the length of reaction time.

*Example 3.—Preparation of a copolymer of 1-(methyldiethoxysilyl-4-butyl)-carborane and dimethyldichlorosilane under anhydrous conditions*

A. PREPARATION OF 1-(METHYLDIETHOXYSILYL-4-BUTYL)-CARBORANE

A 10 parts by weight portion of 1-(3-butenyl)carborane; 10 parts of methyldiethoxysilane and 0.1 part by weight 5% platinum on charcoal catalyst are heated in a citrate bottle at 95° C. for 68 hours. At the end of this time the reaction mixture is filtered off and the 1-(methyldiethoxysilyl-4-butyl)-carborane intermediate purified by distilling at 130–140° C./0.2 mm. of mercury.

B. PREPARATION OF COPOLYMER PRODUCT

In this run equimolar quantities (0.025 mole) of the above monomer and dimethyldichlorosilane are refluxed with 2 parts by weight of anhydrous benzene and a catalytic quantity of anhydrous ferric chloride for a period of about 36 hours. The benzene is stripped off and the residue is washed with water and dried. A viscous liquid product having a molecular weight of 2286 is obtained. The product is thermally stable to 400° C.

As indicated by the numerous process embodiments showing variations in reactants, solvents, reaction times, catalysts and the like illustrated throughout this application, numerous modifications can be made upon the above described reaction conditions and others without departing from the basic inventive concept. The invention is best defined by the claims which follow.

We claim:

1. A copolymer consisting essentially of recurring units of the formula:

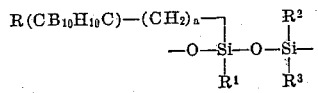
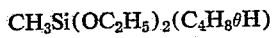

wherein R, R¹, R² and R³ are selected from the group consisting of hydrogen, aliphatic, cycloaliphatic and aryl radicals and $a$ is an integer including 0.

2. A copolymer according to claim 1 and wherein R, R¹, R² and R³ are selected from the group consisting of hydrogen and alkyl radicals of 1 to 4 carbon atoms and $a$ is 2 to 4.

3. A copolymer according to claim 1 and wherein R is hydrogen, R¹, R² and R³ are methyl and $a$ is 4.

4. A copolymer according to claim 1 and wherein R is phenyl, R¹, R² and R³ are methyl and $a$ is 3.

5. A copolymer according to claim 1 and wherein R, R¹, R² and R³ are methyl and $a$ is 3.

6. A copolymer according to claim 1 and wherein R is hydrogen, R¹ is phenyl, R² and R³ are methyl and $a$ is 4.

References Cited

UNITED STATES PATENTS

| | | | |
|---|---|---|---|
| 2,695,307 | 11/1954 | Guillissen et al. | 260—46.5 |
| 3,137,719 | 6/1964 | Papetti | 260—606.5 |
| 3,154,520 | 10/1964 | Dupont et al. | 260—606.5 |

OTHER REFERENCES

Chemical and Engineering News, "New Organoborane Compounds are Stable," American Chemical Society, Washington, D.C., Dec. 9, 1963, pp. 62–70. Copy in the scientific library and in Group 140.

Andrianov: "Polymers With Inorganic Main Chains," Institute of Organoelemental Compounds, Academy of Sciences, U.S.S.R., 1962, pp. 20–22 and 148–188 of the Joint Publications Research Service (J.P.R.S.) translation (obtained from the U.S. Dept. of Commerce Clearinghouse for Federal, Scientific, and Technical Information, Joint Publications Research Service, D.C. 20 443). Copy in the scientific library and Group 140.

DONALD E. CZAJA, *Primary Examiner.*

L. J. BERCOVITZ, *Examiner.*

M. I. MARQUIS, *Assistant Examiner.*